United States Patent [19]

Talmy et al.

[11] Patent Number: 5,041,400

[45] Date of Patent: * Aug. 20, 1991

[54] LOW TEMPERATURE SYNTHESIS OF HIGH PURITY MONOCLINIC CELSIAN

[75] Inventors: Inna G. Talmy, Silver Spring, Md.; Deborah A. Haught, Sterling, Va.

[73] Assignee: The United States of America as represented by the Secretary of the Navy, Washington, D.C.

[*] Notice: The portion of the term of this patent subsequent to Feb. 19, 2008 has been disclaimed.

[21] Appl. No.: 582,269

[22] Filed: Sep. 13, 1990

[51] Int. Cl.$^5$ ............................................... C04B 35/18
[52] U.S. Cl. ...................................... 501/125; 501/128; 423/328; 423/600; 423/637; 423/331
[58] Field of Search ............... 501/133, 104, 105, 138, 501/739, 154; 423/328 C, 328 Z, 327, 331, 600, 637

[56] References Cited

U.S. PATENT DOCUMENTS 4,018,614 4/1977 Nordlie ................................ 501/104
4,994,419 2/1991 Talmy et al. ......................... 501/125

OTHER PUBLICATIONS

Chemical Abstract–"Investigation of Phase Formation During Celsian Synthesis" Pavlova et al., Higher Inst. Chem. Technology, Sofia 1156, Bulgaria, *Dokl Bolg. Akad. Nauk,* 34 (2), pp. 185–188.

Dialog Abstract–SU1018927 (5/23/83) "Ceramic Refractory Material Prepn. by Mixing Monolithic Celsian and Modifier Contg. Oxide of Barium, Aluminum and Silicon in Prescribed Properties", Kharitonov et al.

*Primary Examiner*—William R. Dixon, Jr.
*Assistant Examiner*—Paul Marcantoni
*Attorney, Agent, or Firm*—Kenneth E. Walden; Roger D. Johnson

[57] ABSTRACT

A process for preparing monoclinic celsian from $AlF_3$, $Al_2O_3$, $BaCO_3$, and fused $SiO_2$ powders by heating an intimate mixture of the powders (1) at from about 700° to 900° C. to form topaz and then (2) at a temperature as low as 900° C. to produce monoclinic celsian. The reactions take place in an atmosphere of the gases generated by the reactions.

16 Claims, No Drawings

LOW TEMPERATURE SYNTHESIS OF HIGH PURITY MONOCLINIC CELSIAN

BACKGROUND OF THE INVENTION

This invention relates to ceramics and more particularly to aluminosilicate ceramics.

Ceramics based on monoclinic celsian ($BaO.Al_2O_3.2SiO_2$) can be considered for applications requiring materials with a combination of high melting point, low thermal expansion, high thermal shock resistance, high-frequency working capabilities, low and thermally stable dielectric constant and low loss tangent. For example, celsian is a promising candidate for use as thermally-stable dielectric and refractory materials. Celsian ceramics have been reported in the literature as having a thermal expansion of $2.5 \times 10^{-6}$/degree (at $20°-1000°$ C.), bending strength up to 110 MPa, dielectric constant and loss tangent of 6-7 and $(1-2) \times 10^{-4}$, respectively, at $20°$ C. and 1 MHz, and dielectric constant stable up to $600°$ C. These ceramics were prepared from natural (kaolin or clay) or technical grade purity starting materials containing significant amounts of impurities which can adversely affect all properties, particularly the dielectric behavior of ceramics especially at high temperatures.

Celsian with melting point of about $1760°$ C. exists in two main crystalline modifications: monoclinic, stable up to $1590°$ C., and hexagonal, stable from $1590°$ C. to melting temperature. Although the hexagonal modification is stable at temperatures above $1590°$ C., it tends to be the first product of solid phase reaction and has a strong tendency to persist metastably in the whole temperature range. Hexagonal celsian transforms reversibly into low temperature orthorhombic form at $300°$ C. This transformation is accompanied by significant volume changes. Because of this fact, hexagonal celsian is of no practical use as ceramic materials for high-temperature, especially, thermal cycling applications. Properties of celsian ceramics mentioned above belong to monoclinic modification. Literature reveals that the transformation of hexagonal celsian into the monoclinic form is promoted by prolonged high-temperature (above $1450°$ C.) heating, hydrothermal treatment at about 2 kbar pressure, formation of glass phase during firing, and by the presence of impurities or the addition of certain additives (such as $B_2O_3$, LiF, $Cr_2O_3$, $CaF_2$, $ZrSiO_3$). However, the preparation of monoclinic celsian from high-purity raw materials free of undesirable additives by conventional processes can be only accomplished by long term high temperature treatment.

It would be desirable to provide a method of making pure monoclinic celsian at lower temperatures for shorter heating times without the use of contaminating additives.

SUMMARY OF THE INVENTION

Accordingly, an object of this invention is to provide a method of producing pure monoclinic celsian ($BaO.Al_2O_3.2SiO_2$) at lower temperatures and shorter heating times than conventional methods.

Another object of this invention is to provide a method of producing monoclinic celsian without the use of chemical additives which would contaminate it and adversely affect its dielectric properties.

A further object of this invention is to provide a method of producing monoclinic celsian without the use of chemical additives which would contaminate it and adversely affect its high temperature strength.

These and other objects of this invention are accomplished by providing a process for preparing monoclinic $BaO.Al_2O_3.2SiO_2$ comprising the following steps in order (1) forming an intimate reaction mixture of powders of (a) 1 mole of $BaCO_3$,
(b) 8xy moles of $AlF_3$,
(c) 1-x moles of $Al_2O_3$, and
(d) $8xy+2(1-x)$ moles of $SiO_2$ for each mole of $BaO.Al_2O_3.2SiO_2$ to be produced wherein $0.02 \leq x \leq 1.00$ and $0.5 \leq y \leq 1$;

(2) forming topaz ($Al_2SiO_4F_2$) by heating the mixture at a temperature of from about $700°$ C. to about $900°$ C. in an atmosphere of the gases generated by the topaz formation reaction; and (3) heating the topaz containing reaction mixture in an anhydrous atmosphere of gases generated by the topaz formation, topaz decomposition, and celsian formation reactions at a temperature in the range of (a) from $900°$ C. to less than $1590°$ C. when $0.17 \leq x \leq 1.00$,
(b) from $950°$ C. to less than $1590°$ C. when $0.10 \leq x < 0.17$,
(c) from $1000°$ C. to less than $1590°$ C. when $0.05 \leq x < 0.10$, or
(d) from $1300°$ C. to less than $1590°$ C. when $0.02 \leq x < 0.05$ until the monoclinic $BaO.Al_2O_3.2SiO_2$ is produced.

DETAILED DESCRIPTION OF THE PREFERRED EMBODIMENT

Conventionally, each mole of monoclinic celsian, $BaO.Al_2O_3.2SiO_2$ is prepared by reacting 1 mole of $BaCO_3$, 1 mole $Al_2O_3$, and 2 moles of $SiO_2$ at high temperatures.

The process of this invention produces monoclinic celsian ($BaO.Al_2O_3.2SiO_2$) at lower temperatures by substituting $AlF_3$ for some of the $Al_2O_3$. The amount of $Al_2O_3$ replaced with $AlF_3$ is from 2 to 100, preferably from 5 to less than 100, more preferably from 5 to 17, and still more preferably from 5 to 10 mole percent. In other words, if x is the mole fraction of $Al_2O_3$ replaced with $AlF_3$, then $0.02 \leq x \leq 1.00$, preferably $0.05 \leq x < 1.00$, more preferably $0.05 \leq x \leq 0.17$, and still more preferably $0.05 \leq x \leq 0.10$. The molar ratio of $AlF_3$ to $Al_2O_3$ used in the substitution is from 4:1 to 8:1. In other words, from 4 to 8 moles of $AlF_3$ is used for each mole of $Al_2O_3$ replaced in the starting material. In general, for each mole of monoclinic celsian, $BaO.Al_2O_3.2SiO_2$, produced, the following amounts of starting materials are required:

| moles | starting material |
|---|---|
| 1 | $BaCO_3$ |
| 8xy | $AlF_3$ |
| 1 − x | $Al_2O_3$ |
| 8xy + 2(1 − x) | $SiO_2$ | where $0.5 \leq y \leq 1.0$ and x is as defined above.

The reactions of the present process generate gases that are critical to the operability of the process. However, these gases also contain corrosion components such as $SiF_4$ which must be handled with care and which must be properly disposed of according to EPA regulations. The quantity of these gases generated is directly proportional to the quantity of $AlF_3$ used in the process. Therefore it is desirable to use no more $AlF_3$ than is needed to lower the monoclinic celsian formation temperature to the desired range.

These starting materials are anhydrous $AlF_3$, $Al_2O_3$, fused $SiO_2$, and $BaCO_3$ which are intimately (uniformly) mixed. Commercially available $AlF_3$ (99.90%), $Al_2O_3$ (99.99%), fused $SiO_2$ (99.50%), and $BaCO_3$ (99.8%) are preferably used. The particle size of the $Al_2O_3$ is important and is preferably less than 1 micron, more preferably 0.3 microns or less and still more preferably 0.05 microns or less. The particle sizes of the $AlF_3$, fused $SiO_2$, and $BaCO_3$ are less critical but are preferably less than 40 microns, more preferably 10 microns or less, and still more preferably 5 microns or less. The intimate, uniform mixtures of $AlF_3$, $Al_2O_3$, $SiO_2$, and $BaCO_3$ may be formed by mixing the powders in a suitable volatile solvent such as ethanol and then drying the resulting mixture. The dry mixture is then ground up (with corundum mortar and pestle) and screened through a 500 micron sieve to break up large agglomerates.

The composition of commercially available $AlF_3$ seems to vary considerably. Therefore, it is recommended that a sample of the $AlF_3$ be weighed, heated for a few hours to 600° C., and then reweighed or subjected to thermal gravametric analysis. The weight loss should preferably be less than 3 percent and more preferably less than 1.5 percent. The amount of $AlF_3$ used should be increased to compensate for any loss measured.

The present process comprises two reaction steps. In the first step topaz ($Al_2SiO_4F_2$) is formed from $Al_2O_3$, $AlF_3$, and $SiO_2$ at a temperature of from about 700° to 900° C. In the second step, monoclinic celsian is formed from the topaz-containing mixture produced in the first step. It is critical that both of these reaction steps occur in an atmosphere composed of the gases generated by the reactions themselves. This requires a closed reactor. In the examples, the reactions were run in corundum crucibles covered with corundum discs.

The composition of the reaction generated gases and the mechanism by which they participate in the formation of monoclinic celsian process are not well understood. However, it does appear that $SiF_4$ is an important constituent of the gases generated by the topaz formation, topaz decomposition, and monoclinic celsian formation reactions. However that may be, the reaction-generated gases are clearly critical for the process to work. This criticallity was demonstrated by heating identical samples using the same heating regime in (a) a reaction-generated gas atmosphere (covered crucible), (b) air (uncovered crucible), (c) an inert atmosphere (flowing helium), and (d) vacuum. X-ray diffraction patterns show that running the process reactions (topaz formation, topaz decomposition, and celsian formation) in the reaction-generated gas atmosphere (covered crucible) produces monoclinic celsian with no byproducts (impurities) detected. In contrast, x-ray diffraction patterns show that running the process reactions in air (uncovered crucible), or in an inert atmosphere (flowing helium), or in vacuum produces primarily hexagonal celsian with some monoclinic celsian and with byproducts (impurities) being clearly detected. Thus, it is critical that the topaz formation, topaz decomposition, and monoclinic celsian formation reactions are run in an atmosphere of the gases generated by the reactions.

The first reaction step of the process is the formation of topaz ($Al_2SiO_4F_2$) from the intimate starting mixture of $AlF_3$, $Al_2O_3$, fused $SiO_2$, and $BaCO_3$. Conventional reaction temperatures and times may be used for this topaz production step. For instance, temperatures in the range of from about 700° C. to about 900° C. and reaction times of about 1 to 3 hours work well. Again, it is critical that this topaz production step occurs under an atmosphere of the gases generated by the topaz formation reaction, and preferably under anhydrous conditions. Topaz is produced from $AlF_3$, $Al_2O_3$, and fused $SiO_2$ powders in an atmosphere of reaction-generated gases. This is accomplished by heating the starting mixture ($AlF_3/Al_2O_3/SiO_2/BaCO_3$) in a covered corundum crucible in a furnace. The reaction generates gases which quickly replace the original air in the crucible.

In the second reaction step, the topaz-containing reaction mixture is then heated at an elevated temperature in an atmosphere of the reaction-generated gases, preferably under anhydrous conditions, to produce monoclinic celsian, $BaO.Al_2O_3.2SiO_2$. When $0.17 \leq x \leq 1.00$, the reaction temperature range is preferably from 900° C. to less than 1590° C., more preferably from 900° C. to 1240° C., and still more preferably from 900° C. to 1100° C. When $0.10 \leq x < 0.17$, the reaction temperature range is preferably from 950° C. to less than 1590° C., more preferably from 950° C. to 1240° C., and still more preferably from 950° C. to 1100° C. When $0.05 \leq x < 0.10$, the reaction temperature range is preferably from 1000° C. to less than 1590° C., more preferably from 1000° C. to 1240° C., and still more preferably from 1000° C. to 1100° C. Finally, when $0.02 \leq x < 0.05$, the reaction temperature range is preferably from 1300° C. to less than 1590° C., more preferably from 1300° C. to 1400° C., and still more preferably from 1300° C. to 1350° C. The reaction time for this monoclinic celsian production step is preferably from about 3 to about 10 hours, more preferably from 3 to 5 hours, and still more preferably about 4 hours. The monoclinic celsian product can be held for times longer than 10 hours without damage but there is no advantage to doing so.

The described process can be carried out by first firing to form topaz in the reaction mixture and subsequently firing to produce the monoclinic celsian. Or those two separate firings can be combined into a single firing with a hold at a temperature of from about 700° C. to about 900° C. to form topaz in the reaction mixture followed by a ramp to the elevated monoclinic celsian formation temperature. The one-fire process is preferable because it is more suitable for production on an industrial scale. Moreover, the process can be successfully carried out by continuously heating from room temperature up to the monoclinic celsian formation temperature at a slow heating rate of about 0.5° to 2.0° C./minute without a hold at from about 700° C. to about 900° C.

Table 1 presents a comparison of the prior art procedure which does not use $AlF_3$ with the present process using various amounts of $AlF_3$. Four moles of $AlF_3$ were used for each mole of $Al_2O_3$ replaced in the substitution.

TABLE 1

| | Per mole of celsian | | | |
|---|---|---|---|---|
| x | moles $Al_2O_3$ (1 − x) | moles $AlF_3$ (4x) | minimum reaction temperature | typical hold time |
| 0 | 1.00 | 0 | 1500° C. | ~150 hr |

TABLE 1-continued

| | Per mole of celsian | | | |
|---|---|---|---|---|
| X | moles $Al_2O_3$ (1 − x) | moles $AlF_3$ (4x) | minimum reaction temperature | typical hold time |
| 0.05 | 0.95 | 0.20 | 1000° C. | 3 hr |
| 0.10 | 0.90 | 0.40 | 950° C. | 3 hr |
| 0.17 | 0.83 | 0.68 | 900° C. | 3 hr |
| 1.00 | 0 | 4.0 | 900° C. | 3 hr |

The process time for the prior art process (~150 hours) is much longer than that for the present process (3 hours). The minimum monoclinic celsian formation temperature in the prior art process is 1500° C. As a result, the prior process require special, expensive, high temperature ovens. The present process can be run at temperatures as low as 900° C.

The general nature of the invention having been set forth, the following examples are presented as specific illustrations thereof. It will be understood that the invention is not limited to these specific examples but is susceptible to various modification that will be recognized by one of ordinary skill in the art.

EXAMPLES

Table 2 summarizes the weight percentages for the $AlF_3$, fused $SiO_2$, $BaCO_3$, and $Al_2O_3$ starting materials for the reaction powder mixtures of examples 1 through 6. Note that in examples 1-6, 4 moles of $AlF_3$ was used for each mole of $Al_2O_3$ replaced. The particle size of the $Al_2O_3$ and $AlF_3$ powders was 0.3 microns and that of the fused $SiO_2$ and $BaCO_3$ powders was an average of 4.4 microns. All starting materials were anhydrous.

TABLE 2

| Example | Mole percent of $Al_2O_3$[1] replaced with $AlF_3$ | weight percent | | | |
|---|---|---|---|---|---|
| | | $AlF_3$ | $SiO_2$ | $BaCO_3$ | $Al_2O_3$ |
| 1 | 75 | 36.78 | 30.70 | 28.81 | 3.72 |
| 2 | 17 | 11.91 | 29.31 | 41.14 | 17.64 |
| 3 | 10 | 7.38 | 29.06 | 43.39 | 20.17 |
| 4 | 5 | 3.84 | 28.86 | 45.14 | 22.16 |
| 5 | 3 | 2.34 | 28.77 | 45.89 | 23.00 |
| 6 | 2 | 1.58 | 28.72 | 46.27 | 23.43 |

[1] 4 moles of $AlF_3$ used for each mole of $Al_2O_3$ replaced.

EXAMPLE 1

75 mole percent of $Al_2O_3$ replaced with $AlF_3$ (4:1)

A 25 gram intimate powder mixture composed of the following weight percentages: $AlF_3$, 36.78; $SiO_2$, 30.70; $BaCO_3$, 28.81; and $Al_2O_3$, 3.72 was prepared. A portion (1.01 g) of this mixture was placed in a 20 ml corundum crucible and covered with a corundum disc. The covered crucible was heated according to the following firing schedule:
 (1) ramped from room temperature to 800° C. at 5° C./minute;
 (2) held at 800° C. for 1 hour;
 (3) ramped from 800° C. to 900° C. at 2.5° C./minute; and
 (4) held at 900° C. for 3 hours.
The product was monoclinic celsian.

EXAMPLE 2

17 mole percent of $Al_2O_3$ replaced with $AlF_3$ (4:1)

A 20 gram intimate powder mixture composed of the following weight percentages; $AlF_3$, 11.91; $SiO_2$, 29.31; $BaCO_3$, 41.14; and $Al_2O_3$, 17.64 was prepared. A portion (2.34 g) was placed in a 20 ml corundum crucible and covered with a corundum disc. The covered crucible was heated according to the following firing schedule:
 (1) ramped from room temperature to 800° C. at 5° C./minute;
 (2) held at 800° C. for 1 hour;
 (3) ramped from 800° C. to 900° C. at 2.5° C./minute; and
 (4) held at 900° C. for 3 hours.
The product was monoclinic celsian.

EXAMPLE 3

10 mole percent of $Al_2O_3$ replaced with $AlF_3$ (4:1)

A 20 gram intimate powder mixture composed of the following weight percentages: $AlF_3$, 7.38; $SiO_2$, 29.06; $BaCO_3$, 43.39; and $Al_2O_3$, 20.17 was prepared. A portion (2.16 g) was placed in a 20 ml corundum crucible and covered with a corundum disc. The covered crucible was heated according to the following firing schedule:
 (1) ramped from room temperature to 800° C. at 5° C./minute;
 (2) held at 800° C. for 1 hour;
 (3) ramped from 800° C. to 950° C. at 2.5° C./minute; and
 (4) held at 950° C. for 5 hours.
The product was monoclinic celsian.

EXAMPLE 4

5 mole percent of $Al_2O_3$ replaced with $AlF_3$ (4:1)

A 20 gram intimate powder mixture composed of the following percentages: $AlF_3$, 3.84; $SiO_2$, 28.86; $BaCO_3$, 45.14; and $Al_2O_3$, 22.16 was prepared. A portion (2.83 g) was placed in a 20 ml corundum crucible and covered with a corundum disc. The covered crucible was heated according to the following firing schedule:
 (1) ramped from room temperature to 800° C. at 5° C./minute;
 (2) held at 800° C. for 1 hour;
 (3) ramped from 800° C. to 1000° C. at 2.5° C./minute; and
 (4) held at 1000° C. for 3 hours.
The product was monoclinic celsian.

EXAMPLE 5

3 mole percent of $Al_2O_3$ replaced with $AlF_3$ (4:1)

A 10 gram intimate powder mixture composed of the following weight percentages: $AlF_3$, 2.34; $SiO_2$, 28.77; $BaCO_3$, 45.89; and $Al_2O_3$, 23.00 was prepared. A portion (0.97 g) was placed in a 5.5 ml corundum crucible and covered with a corundum disc. The covered crucible was heated according to the following firing schedule:
 (1) ramped from room temperature to 800° C. at 5° C./minute;
 (2) held at 800° C. for 1 hour;
 (3) ramped from 800° C. to 1300° C. at 2.5° C./minute; and
 (4) held at 1300° C. for 5 hours.
The product was monoclinic celsian.

EXAMPLE 6

2 mole percent of $Al_2O_3$ replaced with $AlF_3$ (4:1)

A 10 gram intimate powder mixture composed of the following weight percentages: $AlF_3$, 1.58; $SiO_2$, 28.72;

BaCO₃, 46.27; and Al₂O₃, 23.43 was prepared. A portion (1.69 g) was placed in a 5.5 ml corundum crucible and covered with a corundum disc. The covered crucible was heated according to the following firing schedule:

(1) ramped from room temperature to 800° C. at 5° C./minute;
(2) held at 800° C. for 1 hour;
(3) ramped from 800° C. to 1300° C. at 2.5° C./minute; and
(4) held at 1300° C. for 5 hours.

The product was monoclinic celsian.

Table 3 summarizes the weight percentages for the AlF₃, fused SiO₂, BaCO₃, and Al₂O₃ starting materials for the reaction powder mixtures of examples 7 through 10. Note that in examples 7–10, 8 moles of AlF₃ was used for each mole of Al₂O₃ replaced. Again, the particle size of the Al₂O₃ and AlF₃ powders was 0.3 microns and that of the fused SiO₂ and BaCO₃ powers was an average of 4.4 microns. All starting materials were anhydrous.

| Example | Mole percent of Al₂O₃[1] replaced with AlF₃ | weight percent | | | |
|---|---|---|---|---|---|
| | | AlF₃ | SiO₂ | BaCO₃ | Al₂O₃ |
| 7 | 100 | 49.77 | 35.61 | 14.62 | 0 |
| 8 | 50 | 37.97 | 33.96 | 22.31 | 5.76 |
| 9 | 10 | 13.11 | 30.48 | 38.51 | 17.90 |
| 10 | 5 | 7.21 | 29.65 | 42.35 | 20.79 |

[1] 8 moles of AlF₃ used for each mole of Al₂O₃ replaced.

EXAMPLE 7

100 mole percent of Al₂O₃ replaced with AlF₃ (8:1)

A 10 gram intimate powder mixture composed of the following weight percentages: AlF₃, 49.77; SiO₂, 35.61; and BaCO₃, 14.62 was prepared. A portion (1.03 g) was placed in a 20 ml corundum crucible and covered with a corundum disc. The covered crucible was heated according to the following firing schedule:

(1) ramped from room temperature to 800° C. at 5° C./minute;
(2) held at 800° C. for one hour;
(3) ramped from 800° C. to 950° C. at 2.5° C./minute; and
(4) held at 950° C. for 3 hours.

The product was monoclinic celsian.

EXAMPLE 8

50 mole percent of Al₂O₃ replaced with AlF₃ (8:1)

A 10 gram intimate powder mixture composed of the following weight percentages: AlF₃, 37.97; SiO₂, 33.96; BaCO₃, 22.31; and Al₂O₃, 5.76 was prepared. A portion (1.55 g) was placed in a 20 ml corundum crucible and covered with a corundum disc. The covered crucible was heated according to the same firing schedule as in example 7. The product was monoclinic celsian.

EXAMPLE 9

10 mole percent of Al₂O₃ replaced with AlF₃ (8:1)

A 10 gram intimate powder mixture composed of the following weight percentages: AlF₃, 13.11; SiO₂, 30.48; BaCO₃, 38.51; and Al₂O₃, 17.90 was prepared. A portion (2.05 g) was placed in a 20 ml corundum crucible and covered with a corundum disc. The covered crucible was heated according to the same firing schedule as in example 7. The product was monoclinic celsian.

EXAMPLE 10

5 mole percent of Al₂O₃ replaced with AlF₃ (8:1)

A 10 gram intimate powder mixture composed of the following weight percentages: AlF₃, 7.21; SiO₂, 29.65; BaCO₃, 42.35; and Al₂O₃, 20.79 was prepared. A portion (2.16 g) was placed in a 20 ml corundum crucible and covered with a corundum disc. The covered crucible was heated according to the same firing schedule as in example 7. The product was monoclinic celsian.

Samples which were duplicates of the samples of examples 7, 8, 9, and 10 were prepared and subjected to the heating schedule of example 7 (and thus examples 8, 9, and 10) but in open (uncovered) 20 ml corundum crucibles. The products were primarily hexagonal celsian with a small amount of monoclinic celsian and detectable amounts of byproducts (impurities). This again illustrates the criticallity of running the reaction in an atmosphere of the gases generated by the reactions.

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A process for preparing monoclinic BaO.Al₂O₃.2SiO₂ comprising the following steps in order:
   (1) forming an intimate mixture of powders of
      (a) 1 mole of BaCO₃,
      (b) 8xy moles of AlF₃,
      (c) 1-x moles of Al₂O₃, and
      (d) 8xy+2(1-x) moles of SiO₂
   for each mole of BaO.Al₂O₃.2SiO₂ to be produced wherein $0.02 \leq x \leq 1.00$ and $0.5 \leq y \leq 1$;
   (2) forming topaz by heating the mixture produced in step (1) at a temperature of from about 700° to about 900° C. in an atmosphere of the gases generated by the topaz formation reaction; and then
   (3) heating the topaz-containing mixture produced in step (2) in an atmosphere of gases generated by the topaz formation and BaO.Al₂O₃.2SiO₂ formation reactions at a temperature in the range of
      (a) from 900° C. to less than 1590° C. if $0.17 \leq x \leq 1.00$,
      (b) from 950° C. to less than 1590° C. if $0.10 \leq x \leq 0.17$,
      (c) from 1000° C. to less than 1590° C. if $0.05 \leq x \leq 0.10$ or
      (d) from 1300° C. to less than 1590° C. if $0.02 \leq x < 0.05$
   until the monoclinic BaO.Al₂O₃.2SiO₂ is produced.

2. The process of claim 1 wherein $0.17 \leq x \leq 1.00$ and the temperature in step (3) is in the range of from 900° C. to less than 1590° C.

3. The process of claim 2 wherein the temperature in step (3) is in the range of from 900° C. to 1240° C.

4. The process of claim 3 wherein the temperature in step (3) is in the range of from 900° C. to 1100° C.

5. The process of claim 1 wherein $0.10 \leq x < 0.17$ and the temperature in step (3) is in the range of from 950° C. to less than 1590° C.

6. The process of claim 5 wherein the temperature in step (3) is in the range of from 950° C. to 1240° C.

7. The process of claim 6 wherein the temperature in step (3) is in the range of from 950° C. to 1100° C.

8. The process of claim 1 wherein $0.05 \leq x < 0.10$ and the temperature in step (3) is in the range of from 1000° C. to less than 1590° C.

9. The process of claim 8 wherein the temperature in step (3) is in the range of from 1000° C. to 1240° C.

10. The process of claim 9 wherein the temperature in step (3) is in the range of from 1000° C. to 1100° C.

11. The process of claim 1 wherein $0.02 \leq x < 0.05$ and the temperature in step (3) is in the range of from 1300° C. to less than 1590° C.

12. The process of claim 11 wherein the temperature in step (3) is in the range of from 1300° C. to 1400° C.

13. The process of claim 12 wherein the temperature in step (3) is in the range of from 1300° C. to 1350° C.

14. The process of claim 1 wherein $0.05 \leq x < 1.00$.

15. The process of claim 14 wherein $0.05 \leq x \leq 0.17$.

16. The process of claim 15 wherein $0.05 \leq x \leq 0.10$.

* * * * *